United States Patent
Kubota et al.

(10) Patent No.: US 11,264,750 B2
(45) Date of Patent: *Mar. 1, 2022

(54) TIN-PLATED COPPER TERMINAL MATERIAL, TERMINAL, AND ELECTRIC-WIRE TERMINAL STRUCTURE

(71) Applicant: MITSUBISHI MATERIALS CORPORATION, Tokyo (JP)

(72) Inventors: Kenji Kubota, Naka (JP); Yoshie Tarutani, Naka (JP); Kiyotaka Nakaya, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/612,812

(22) PCT Filed: May 15, 2018

(86) PCT No.: PCT/JP2018/018747
§ 371 (c)(1),
(2) Date: Nov. 12, 2019

(87) PCT Pub. No.: WO2018/212174
PCT Pub. Date: Nov. 22, 2018

(65) Prior Publication Data
US 2020/0203868 A1 Jun. 25, 2020

(30) Foreign Application Priority Data
May 16, 2017 (JP) .............................. JP2017-096979

(51) Int. Cl.
*H01R 13/03* (2006.01)
*H01R 4/18* (2006.01)
(Continued)

(52) U.S. Cl.
CPC ............. *H01R 13/03* (2013.01); *C22C 18/00* (2013.01); *C25D 5/10* (2013.01); *C25D 5/12* (2013.01);
(Continued)

(58) Field of Classification Search
CPC . B32B 15/20; B32B 2250/03; B32B 2250/04; B32B 2255/06; B32B 2255/205;
(Continued)

(56) References Cited

U.S. PATENT DOCUMENTS 6,613,451 B1 * 9/2003 Asahara ................ C23C 28/021
428/647
10,858,750 B2 * 12/2020 Kubota ..................... H01R 4/62
(Continued)

FOREIGN PATENT DOCUMENTS

CN 108352639 A 7/2018
CN 110214203 A 9/2019
(Continued)

OTHER PUBLICATIONS

Supplementary European Search Report dated Feb. 26, 2021, issued for European Patent Application No. 18801262.9.
(Continued)

*Primary Examiner* — Humera N. Sheikh
*Assistant Examiner* — John D Schneible
(74) *Attorney, Agent, or Firm* — Locke Lord LLP; James E. Armstrong, IV; Nicholas J. DiCeglie, Jr.

(57) ABSTRACT

Provided is a tin-plated copper terminal material, a terminal formed from the terminal material, and an electric-wire terminal structure using the terminal: the terminal material has a substrate of copper or a copper alloy; an intermediate zinc layer of a zinc alloy that is formed on the substrate and has a thickness of 0.10 μm to 5.00 μm; and a tin layer of tin or a tin alloy that is formed on the intermediate zinc layer
(Continued)

and in which the length proportion occupied by low-angle grain boundaries is 2% to 30% with respect to the total length of all crystal grain boundaries; wherein galvanic corrosion is effectively suppressed.

10 Claims, 4 Drawing Sheets

(51) Int. Cl.
*H01R 4/62* (2006.01)
*C25D 5/12* (2006.01)
*C22C 18/00* (2006.01)
*C25D 5/10* (2006.01)
*C25D 7/00* (2006.01)
*C25D 5/00* (2006.01)
*C22C 13/00* (2006.01)
*H01B 1/02* (2006.01)
*B32B 15/20* (2006.01)

(52) U.S. Cl.
CPC ............... *C25D 5/617* (2020.08); *C25D 7/00* (2013.01); *H01R 4/185* (2013.01); *H01R 4/62* (2013.01); *B32B 15/20* (2013.01); *B32B 2250/03* (2013.01); *B32B 2255/06* (2013.01); *B32B 2255/205* (2013.01); *C22C 13/00* (2013.01); *H01B 1/026* (2013.01); *Y10T 428/12708* (2015.01); *Y10T 428/12715* (2015.01)

(58) Field of Classification Search
CPC ..... B32B 2457/08; C22C 18/00; C22C 13/00; C23C 18/1651; C25D 1/04; C25D 3/12; C25D 3/30; C25D 3/38; C25D 3/565; C25D 5/022; C25D 5/10; C25D 5/12; C25D 7/00; C25D 7/0614; C25D 7/0607; H05K 2201/0355; H05K 2203/0723; H01R 4/185; H01R 4/62; H01R 13/03; H01R 4/18; Y10T 428/12708; Y10T 428/12715; Y10T 428/12785; Y10T 428/12493; C23F 15/00; H01B 1/026; H01B 1/023; H01B 7/00
USPC ............................ 205/112; 428/336, 615, 647
See application file for complete search history.

(56) References Cited

U.S. PATENT DOCUMENTS

| 2011/0045713 | A1 | | 2/2011 | Ono et al. |
| 2016/0064847 | A1 | | 3/2016 | Gaertner |
| 2018/0347062 | A1 | * | 12/2018 | Kubota .................. C25D 5/505 |
| 2019/0386415 | A1 | | 12/2019 | Kubota et al. |
| 2020/0259274 | A1 | * | 8/2020 | Kubota .................. C22C 18/00 |

FOREIGN PATENT DOCUMENTS

| EP | 3012919 A1 * | 4/2016 | ............... C25D 5/12 |
| EP | 3012919 A1 | 4/2016 | |
| EP | 3382814 A1 | 10/2018 | |
| EP | 3392382 A1 | 10/2018 | |
| JP | 2008-285729 A | 11/2008 | |
| JP | 2010-10013 A | 1/2010 | |
| JP | 2011-219822 A | 11/2011 | |
| JP | 2013-218866 A | 10/2013 | |
| JP | 2015-133306 A | 7/2015 | |
| JP | 2016-518528 A | 6/2016 | |
| JP | 2016-169439 A | 9/2016 | |
| WO | 2014/060254 A1 | 4/2014 | |

OTHER PUBLICATIONS

International Search Report dated Jul. 3, 2018, issued for PCT/JP2018/018747.
Office Action issued in corresponding Chinese Patent Application No. CN 201880030272.2, dated Jul. 2, 2021.
Office Action dated Sep. 27, 2021 for Taiwan Patent Application No. 107116575.

* cited by examiner

TIN-PLATED COPPER TERMINAL MATERIAL, TERMINAL, AND ELECTRIC-WIRE TERMINAL STRUCTURE

BACKGROUND OF THE INVENTION

Technical Field

The present invention relates to a tin-plated copper terminal material, a terminal made of the terminal material, and an electric-wire terminal structure using the terminal.

Priority is claimed on Japanese Patent Application No. 2017-096979, filed May 16, 2017, the content of which is incorporated herein by reference.

Background Art

Conventionally, by connecting a terminal crimped to a terminal end of a conductive wire to a terminal provided on the other equipment, the conductive wire is connected to the equipment. The conductive wire and the terminal are generally formed from copper or a copper alloy having high electrical conductivity; a conductive wire made of aluminum or an aluminum alloy is also used for reducing weight and so forth.

For instance, in Patent Document 1, disclosed is an electric wire with a terminal mounted on vehicles such as an automobile, in which a terminal made of copper (a copper alloy) on which tin plating is formed is crimped on a conducting wire made of aluminum or an aluminum alloy.

In a case in which the conductive wire is made of aluminum or an aluminum alloy and the terminal is made of copper or a copper alloy, if water enters between the terminal and the conductive wire; the conductive wire may corrode by galvanic corrosion resulting from an electric potential difference between different metals; and it may arise that an electrical resistance value in a crimped part be increased and a crimping force be reduced.

In order to prevent the galvanic corrosion, in Patent Document 1 for instance, between a substrate layer and a tin layer in the terminal, an anti-corrosion layer made of a metal (zinc or a zinc alloy) having a sacrificial anti-corrosion property against the substrate layer is formed.

An electrical contact material for connectors shown in Patent Document 2 has a substrate made of a metal material, an alloy layer formed on the substrate, and a conductive film layer formed on a surface of the alloy layer. The alloy layer essentially includes Sn (tin), and further includes one or more of an additive element selected from Cu, Zn, Co, Ni and Pd. As the conductive film layer, one including $Sn_3O_2(OH)_2$ (hydroxide-oxide) is disclosed.

As an example of adding Zn in Sn, Patent Document 3 discloses an Sn plating material. This Sn plating material has a ground Ni-plating layer, an intermediate Sn—Cu plating layer, and a superficial Sn plating layer in order on a surface of copper or a copper alloy. In this Sn plating material, the ground Ni-plating layer is made of Ni or a Ni alloy; and the intermediate Sn—Cu plating layer is made of an Sn—Cu alloy in which an Sn—Cu—Zn alloy layer is formed at least at a side in contact with the superficial Sn plating layer: the superficial Sn plating layer is made of an Sn alloy including Zn with 5 to 1000 ppm by mass, and further has a high-concentration Zn layer in which Zn concentration is more than 0.2% by mass to 10% by mass on an outermost surface.

CITATION LIST

Patent Literature

Patent Document 1: Japanese Unexamined Patent Application, Publication No. 2013-218866
Patent Document 2: Japanese Unexamined Patent Application, Publication No. 2015-133306
Patent Document 3: Japanese Unexamined Patent Application, Publication No. 2008-285729

SUMMARY OF INVENTION

Technical Problem

In a case in which the anti-corrosion layer made of zinc or a zinc alloy is provided as a ground of the tin layer as in Patent Document 1, there is a problem in that an Sn substitution arises when carrying out an Sn plating treatment on the anti-corrosion layer, and adhesiveness between the anti-corrosion layer and the Sn plating is deteriorated.

In a case in which the conductive film layer including $Sn_3O_2(OH)_2$ (hydroxide-oxide) is provided as in Patent Document 2, there is a problem in that the conductive film layer is immediately damaged when it is exposed in corrosive environment or heating environment and durability is low. Moreover, one having the Sn—Zn alloy (the superficial Sn plating layer) laminated on the Sn—Cu type alloy layer (the intermediate Sn—Cu plating layer) and the high-concentration Zn layer on the outermost layer as in Patent Document 3 has a problem in that the Sn—Zn alloy plating is low in productivity, and an anti-corrosion effect cannot be obtained with respect to the conductive wire made of aluminum if copper in the Sn—Cu type alloy layer is exposed on a surface layer.

The present invention is achieved in consideration of the above circumstances, and has an object to provide a tin-plated copper terminal material in which the galvanic corrosion is effectively suppressed, a terminal made of the terminal material, and an electric-wire terminal structure using the terminal.

Solution to Problem

A tin-plated copper terminal material of the present invention has: a substrate made of copper or a copper alloy; an intermediate zinc layer which is formed on the substrate, made of a zinc alloy, and has a thickness of 0.10 μm to 5.00 μm (inclusive); and a tin layer which is formed on the intermediate zinc layer, made of tin or a tin alloy, in which a proportion of a length occupied by low-angle grain boundaries in a length of all crystal grain boundaries is 2% to 30% (inclusive).

In this tin-plated copper terminal material, since the intermediate zinc layer which is made of a zinc alloy having a corrosion potential nearer to that of aluminum than that of tin is provided under the tin layer at a surface and zinc thereof is diffused on the surface of the tin layer; a corrosion potential is lowered at the surface. Thereby, there is an effect of preventing contact corrosion of different metals (galvanic corrosion) when being in contact with a conductive wire made of aluminum and the like having a lower corrosion potential than that of copper.

In this case, if the thickness of the intermediate zinc layer is less than 0.10 μm, the diffusion of zinc to the surface of the tin layer is not enough, so that the effect of reducing the corrosion potential at the surface is not enough and a corrosion current is increased. If the thickness of the intermediate zinc layer is more than 5.00 μm, breakages may arise while a bending work.

The zinc in the intermediate zinc layer under the tin layer is supplied to the surface through the crystal grain boundaries of the tin layer: diffusion speed of zinc is low through the low-angle grain boundaries among the crystal grain boundaries, and it does not contribute to the diffusion of zinc (i.e., reduction of the corrosion potential). Accordingly, by appropriately setting the proportion of the low-angle grain boundaries, the diffusion speed of zinc can be controlled to be desirable. If the length proportion of the low-angle grain boundaries is less than 2%, zinc is excessively supplied, so that whiskers can be easily generated. If the length proportion of the low-angle grain boundaries is more than 30%, zinc is not diffused enough, the effect of reducing the corrosion potential is not enough, and the corrosion current is high.

In the tin-plated copper terminal material of the present invention, it is preferable that corrosion potential with respect to a silver-silver chloride electrode be not more than −500 mV and not less than −900 mV.

In this case, the corrosion current can be reduced low and an anti-corrosion effect is excellent.

In the tin-plated copper terminal material of the present invention, it is preferable that the intermediate zinc layer include one or more additional elements among nickel, iron, manganese, molybdenum, cobalt, cadmium and lead, and content percentage of zinc in the intermediate zinc layer be 65% to 95% by mass (inclusive).

By including these additional elements, zinc is prevented from excessive diffusing and there is an effect of reducing the generation of whiskers. If the content percentage of zinc is more than 95% by mass, the zinc diffusion to the surface of the tin layer is excessive, contact resistance is increased, and the effect of preventing the whiskers is poor. If the content percentage of zinc is less than 65% by mass, the zinc diffusion is not enough, and the corrosion current tends to be high.

In the tin-plated copper terminal material of the present invention, it is preferable that an average crystal grain size of the tin layer be 0.5 μm to 8.0 μm (inclusive).

If the average crystal grain size of the tin layer is less than 0.5 μm, zinc is excessively diffused because density of the crystal grain boundaries is too high, corrosion durability of the tin layer is deteriorated, the tin layer exposed in the corrosive environment corrodes, and the contact resistance may be deteriorated with respect to the conductive wire. If the average crystal grain size of the tin layer is more than 8.0 μm, the zinc diffusion is not enough, and the effect of preventing the corrosion of the conductive wire is poor.

In the tin-plated copper terminal material of the present invention, it is preferable that a surface metallic-zinc layer be provided on the tin layer. In this case, it is possible to prevent generation of the galvanic corrosion resulting from contact with the conductive wire more reliably.

It is more preferable that the surface metallic-zinc layer have zinc concentration of 5 at % to 40 at % (inclusive) and a thickness of 1.0 nm to 10.0 nm (inclusive) in terms of $SiO_2$.

In the tin-plated copper terminal material of the present invention, it is preferable that a ground layer be provided between the substrate and the intermediate zinc layer, that is made of nickel or a nickel alloy, with a thickness of 0.10 μm to 5.00 μm (inclusive) and a nickel content percentage of not less than 80% by mass.

The ground layer between the substrate and the intermediate zinc layer has functions of improving adhesiveness between them and preventing diffusion of copper from the substrate made of copper or a copper alloy to the intermediate zinc layer and the tin layer. If the thickness of the ground layer is less than 0.10 μm, the effect of preventing copper from diffusion is poor: if it is more than 5.00 μm, breakages easily arise while a press process. Moreover, if the nickel content percentage in the ground layer is less than 80% by mass, the effect of preventing copper from diffusing to the intermediate zinc layer and the tin layer is small.

It is preferable that the tin-plated copper terminal material of the present invention have a belt-sheet shape carrier part and elements for terminal connected to the carrier part and disposed with interval in a longitudinal direction of the carrier part.

A terminal of the present invention is a terminal formed from the above-mentioned tin-plated copper terminal material. An electric-wire terminal structure of the present invention is formed by crimping the terminal to a terminal end of an electric wire having a conductive wire made of aluminum or an aluminum alloy.

Advantageous Effects of Invention

According to the tin-plated copper terminal material of the present invention, since zinc is diffused in the tin layer so that the corrosion potential is lowered, there is the anti-corrosion effect with respect to the conductive wire with the low corrosion potential. Moreover, even though the tin layer is disappeared, the galvanic corrosion of the conductive wire is prevented by the intermediate zinc layer, so it is possible to prevent the electrical resistance value from rising and the adhesiveness from deteriorating.

DESCRIPTION OF EMBODIMENTS

Figure 2:
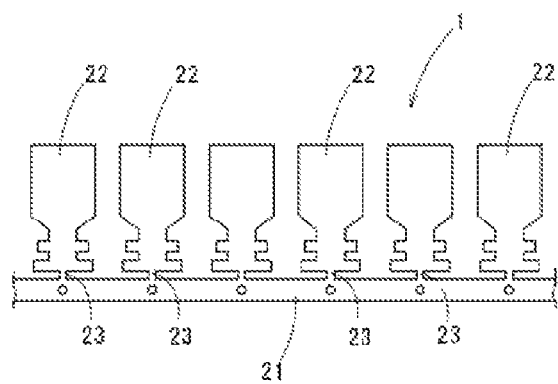
FIG. 2 It is a plan view of the tin-plated copper terminal material according to the embodiment of the present invention.

A tin-plated copper terminal material 1, a terminal 10 and an electric-wire terminal structure of an embodiment of the present invention will be explained. The tin-plated copper terminal material 1 of the present embodiment is, as FIG. 2 showing the whole, a belt-sheet material (a strip material)

for forming terminals 10: a carrier part 21 along a longitudinal direction of the strip material and elements for terminal 22 which are disposed with interval in a longitudinal direction of the carrier part 21 and to be formed as the terminals 10 are connected via narrow connecting parts 23. Each of the elements for terminal 22 is formed into a shape of the terminal 10 shown in FIG. 3, and finished as the terminal 10 by cutting off from the connecting parts 23. The terminal 10 is explained by exemplifying a female terminal in this embodiment though, it may be a male terminal.

In the terminal 10 (a female terminal in the example of FIG. 3), a coat-crimping part 14 to which a coat 12b of an electrical wire 12 is crimped, a core-crimping part 13 to which a core 12a which is a conductive wire exposed from the coat 12b of the electrical wire 12 is crimped, and a connector part 11 to which a male terminal (not illustrated) is fit-inserted are integrally formed in this order from a base end.

Figure 4:
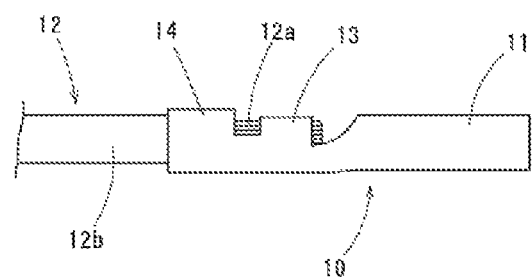
FIG. 4 It is a frontal view showing an electric-wire terminal structure formed by crimping the terminal in FIG. 3.

FIG. 4 shows an electric-wire terminal structure in which the terminal 10 is crimped to the electrical wire 12. In this structure, the core-crimping part 13 is in directly contact with the core 12a of the electrical wire 12.

Figure 1:
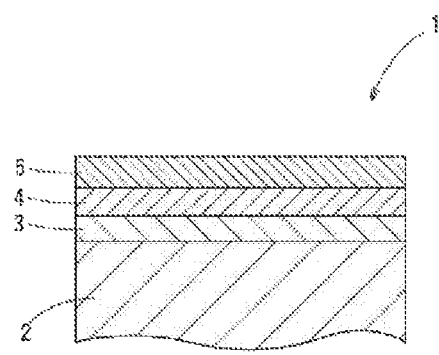
FIG. 1 It is a schematic view showing a cross section of a tin-plated copper terminal material according to an embodiment of the present invention.

In the tin-plated copper terminal material 1, as FIG. 1 schematically showing a cross section, a ground layer 3 made of nickel or a nickel alloy, an intermediated zinc layer 4 made of a zinc alloy, and a tin layer 5 made of tin or a tin alloy are laminated in this order on a substrate 2 made of copper or a copper alloy.

The substrate 2 is not specifically limited in composition thereof if it is made of copper or a copper alloy.

The grounding layer 3 made of nickel or a nickel alloy has a thickness of 0.10 µm to 5.00 µm (inclusive) and a nickel content percentage of not less than 80% by mass. The ground layer 3 has functions of improving the adhesiveness of the substrate 2 and the intermediate zinc layer 4 and preventing copper diffusion from the substrate 2 to the intermediate zinc layer 4 and the tin layer 5.

If the thickness of the ground layer 3 is less than 0.10 µm, an effect of preventing the copper diffusion is poor: if it is more than 5.00 µm, breakages are easily generated while a press working. The thickness of the ground layer 3 is more preferably 0.30 µm to 2.00 µm (inclusive).

If the nickel content percentage in the ground layer 3 is less than 80% by mass, the effect of preventing copper from diffusing to the intermediate zinc layer 4 and the tin layer 5 is small. It is more preferable that the nickel content percentage be not less than 90% by mass.

The intermediate zinc layer 4 made of zinc alloy has a thickness of 0.10 µm to 5.00 µm (inclusive) and includes one or more of nickel, iron, manganese, molybdenum, cobalt, cadmium and lead as an additive element: a zinc content percentage is 65% to 95% by mass (inclusive). The zinc content percentage is more preferably 75% to 90% by mass (inclusive).

If the thickness of the intermediate zinc layer 4 is less than 0.10 µm, the zinc diffusion to the tin layer 5 is not enough and an effect of lowering an electric potential at a surface is not enough, so that corrosion current is increased. If the thickness of the intermediate zinc layer is not less than 5.00 µm, breakages may arise while a bending work. It is more preferable that the thickness of the intermediate zinc layer 4 be 0.40 µm to 2.00 µm (inclusive).

By including one or more of nickel, iron, manganese, molybdenum, cobalt, cadmium, and lead as the additive element(s) in the intermediate zinc layer 4, there are effects of reducing excessive diffusion of zinc and reducing generation of whiskers. If the zinc content percentage exceeds 95% by mass, the zinc diffuses excessively to the surface of the tin layer 5, the contact resistance is increased and the effect of reducing the whiskers is poor. If the zinc content percentage is less than 65% by mass, the zinc diffusion is not enough and the corrosion current is high. It is especially preferable that the zinc content percentage be 75% to 90% by mass (inclusive).

In the tin layer 5 made of tin or a tin alloy, a proportion of a length of low-angle grain boundaries in a total length of all crystal grain boundaries (a length proportion of low-angle grain boundaries) is 2% to 30% (inclusive). Here, the crystal grain boundaries and the low-angle boundaries are as follows: measured by a back-scattered electron beam diffraction pattern method (an electron back scatter diffraction pattern: EBSD or EBSP) using a scanning electron microscope (SEM), measured points in which an orientation difference between adjacent measured points is not less than 2° are the crystal grain boundaries: and moreover, among these crystal grain boundaries, the crystal grain boundaries in which the orientation difference between the adjacent measured points is less than 15° are the low-angle grain boundaries.

If the length proportion of the low-angle grain boundaries of the tin layer 5 is less than 2%, the supply of zinc (the diffusion to the tin layer 5) is excessive and the whiskers are easily generated. If the length proportion of the low-angle grain boundaries excesses 30%, zinc is not diffused enough, the effect of lowering the corrosion potential at the surface is not enough and the corrosion current is high. It is more preferable that the length proportion of the low-angle grain boundaries be 5% to 15% (inclusive).

An average crystal grain size of the tin layer 5 is 0.5 µm to 8.0 µm (inclusive). If the average crystal grain size is less than 0.5 µm, density of the crystal grain boundaries is too high, zinc is excessively diffused, durability of corrosion of the tin layer 5 is deteriorated, the tin layer 5 exposed in corrosive environment corrodes, and contact resistance with respect to the core 12a (a bundle of conductive wires made of aluminum) of the electrical wire 12 may be deteriorated. If the average crystal grain size exceeds 8.0 µm, the zinc diffusion is not enough and the effect of preventing corrosion of the core 12a made of aluminum is poor.

It is preferable that a thickness of the tin layer 5 be 0.2 µm to 5 µm (inclusive). In the vicinity of a surface of the tin layer 5, metallic-zinc diffused from the intermediate zinc layer 4 is concentrated.

Corrosion potential of aluminum is −900 mV to −700 mV (inclusive), while corrosion potential of the tin-plated copper terminal material 1 having this structure is −900 mV to −500 mV (inclusive) (−500 mV to −900 mV) with respect to the silver-silver chloride electrode: accordingly, the anticorrosion effect is excellent.

Next, a method of manufacturing the tin-plated copper terminal material 1 will be explained. A board made of copper or a copper alloy is prepared as the substrate 2. This board is formed into a strip material in which the elements for terminal 22 are connected to the carrier part 21 via the connecting parts 23 is formed as shown in FIG. 2 by cutting, drilling and so forth. Then, after cleaning a surface of the strip material by treatments of degreasing, pickling and the like; a treatment of nickel plating or a treatment of nickel alloy plating for forming the ground layer 3, a treatment of zinc plating or a treatment of zinc alloy plating for forming the intermediate zinc layer 4, and a treatment of tin plating or a treatment of tin alloy plating for forming the tin layer 5 are performed in this order.

The treatment of nickel plating or the treatment of nickel alloy plating for forming the ground layer 3 is not specifically limited if a dense film made mainly of nickel can be obtained: electroplating using a Watt bath, a sulfamic acid bath, a citric acid bath and the like which are known can be used. As the nickel alloy, a nickel tungsten (Ni—W) alloy, a nickel phosphorus (Ni—P) alloy, a nickel cobalt (Ni—Co) alloy, a nickel chrome (Ni—Cr) alloy, a ferronickel (Ni—Fe) alloy, a nickel zinc (Ni—Zn) alloy, a nickel boron (Ni—B) alloy and the like can be used. Considering a press bendability and a barrier property with respect to copper in the elements for terminal 22 (the terminals 10), a pure nickel plating which is obtained by the sulfamic acid bath is desirable.

The treatment of the zinc plating or the treatment of the zinc alloy plating for forming the intermediate zinc layer 4 is not specifically limited if a dense film can be obtained with a desired composition: it is preferable to use a method of electroplating viewed in productivity. For the treatment of the zinc plating, a sulfate bath, a chloride bath, a zincate bath and the like which are known can be used. As the treatment of the zinc alloy plating, used are: a treatment of nickel zinc alloy plating using a sulfate bath, a chloride bath, and an alkaline bath; a treatment of tin zinc alloy plating using a complexing agent bath including citric acid; a treatment of zinc cobalt alloy plating using a sulfate bath; a treatment of zinc manganese alloy plating using a sulfate bath including citric acid; and a treatment of zinc molybdenum plating using a sulfate bath. Moreover, it is possible to use an evaporation method.

It is necessary in the treatment of the tin plating or the tin alloy plating for forming the tin layer 5 to control the length proportion of the low-angle grain boundaries to be an optimal value. Therefore, a treatment of electroplating using an organic acid (a phenol sulfonic acid bath, an alkane sulfonic acid bath, an alkanol sulfonic acid bath, for instance), an acidic solution (a fluoroboric acid bath, a halogen bath, a sulfuric acid bath, a pyrophosphoric acid, or the like), an alkaline bath (a potassium bath, a sodium bath or the like) and so forth, for instance, can be adopted. Considering fast film-formability, density of the film and easiness of zinc diffusion, it is preferable to use the organic acid bath or the sulfonic acid bath which are acidic, and to add a non-ionic surfactant to the bath as an additive agent. In this case, in accordance with settings of temperature of the bath and the additive agent, it is possible to control the crystal grain size and the length proportion of the low-angle grain boundaries. A melting treatment such as reflowing is not performed because the length proportion of the low-angle grain boundaries is considerably increased.

By these treatments, zinc is diffused from the intermediate zinc layer 4 to the tin layer 5, and also tin is diffused from the tin layer 5 to the intermediate zinc layer 4 (mutual diffusion). In order to advance the mutual diffusion between the intermediate zinc layer 4 and the tin layer 5 in ordinary temperature, it is important to clean the surface of the intermediate zinc layer 4 before laminating the tin layer 5. Since hydroxide and oxide are promptly generated on the surface of the intermediate zinc layer 4; in a case in which the films are continuously formed by the plating treatments, after removing the hydroxide and oxide by cleansing using a sodium hydroxide aqueous solution or an ammonium chloride aqueous solution, it is preferable to form the film of tin plating immediately. When the film of the tin layer 5 is formed by a dry process such as deposition, it is preferable to form the film of the tin layer 5 after etching the surface of the intermediate zinc layer 4 by a treatment of argon sputtering.

In the tin-plated copper terminal material 1 manufactured as above-described, the ground layer 3 made of nickel or the nickel alloy, the intermediate zinc layer 4 made of the zinc alloy, and the tin layer 5 are laminated on the whole upon the substrate 2 in this order.

Figure 3:
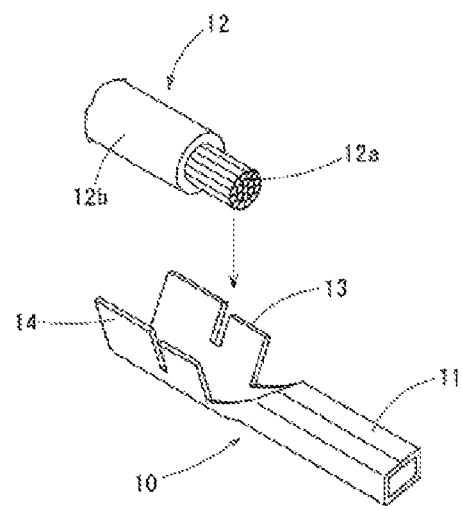
FIG. 3 It is a perspective view showing an example of a terminal formed from the tin-plated copper terminal material of the embodiment of the present invention.

Then, the terminals 10 are made by working on the elements for terminal 22 in a state of the strip material by press working and the like into the shape of the terminal 10 shown in FIG. 3 and cutting the connecting parts 23.

FIG. 4 shows a terminal end in which the terminal 10 is crimped to the electrical wire 12. The core-crimping part 13 is directly in contact with the core 12*a* of the electrical wire 12 in this structure.

In the terminal 10, since the zinc with the nearer corrosion potential to aluminum than that of tin is diffused in the tin layer 5, the effect of preventing the corrosion of the aluminum is high; so that it is possible to effectively prevent the generation of the galvanic corrosion even in a state of being crimped to the core 12*a* made of aluminum.

Moreover, the substrate 2 of the terminal 10 is not exposed even at end surfaces because the plate treatment is carried out in the state of the strip material shown in FIG. 2: accordingly, the excellent anti-corrosion effect is shown.

Furthermore, since the intermediate zinc layer 4 is formed under the tin layer 5, even if the tin layer 5 is completely or partly disappeared by abrasion or the like, the galvanic corrosion can be reliably prevented from generating by the intermediate zinc layer 4 in which the corrosion potential is near to that of aluminum.

The present invention is not limited to the above-described embodiment and various modifications may be made without departing from the scope of the present invention.

Figure 5:
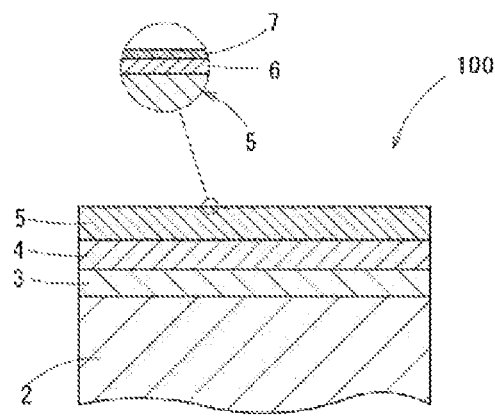
FIG. 5 It is a schematic view showing a cross section of a tin-plated copper terminal material according to another embodiment of the present invention.

For instance, the outermost surface of the tin-plated copper terminal material 1 is formed by the tin layer 5 in the above-mentioned embodiment: it is also appropriate that a surface metallic-zinc layer 6 is formed on the tin layer 5 as in a tin-plated copper terminal material 100 shown in FIG. 5. Since the surface is formed from the surface metallic-zinc layer 6, it is possible to more reliably reduce the generation of the galvanic corrosion resulting from the contact with the aluminum conductive wire.

The surface metallic-zinc layer 6 is formed on the surface of the tin layer 5 by diffusing the zinc in the intermediate zinc layer 4 through the tin layer 5 to the surface. In order to reliably form the surface metallic-zinc layer 6, further heat treatment may be carried out on the tin-plated copper terminal material 1 in the above-described embodiment. As conditions for the heat treatment, it is preferable to maintain temperature 30° C. to 160° C. (inclusive) and 30 minutes to 60 minutes (inclusive).

It is more preferable for the surface metallic-zinc layer 6 that zinc concentration be 5 at % to 40 at % (inclusive), and a thickness in terms of $SiO_2$ be 1.0 nm to 10.0 nm (inclusive).

In addition, a thin oxide layer 7 is generated on the surface metallic-zinc layer 6.

EXAMPLES

Test pieces 1 to 19 were made by using a copper board made of C1020 (oxygen-free copper) as the substrate, degreasing and pickling it, and carrying out following treatments in order: a treatment of nickel plating or a treatment of nickel alloy plating (only for the test pieces 13 to 16 and 18) for forming the ground layer, a treatment of zinc plating or a treatment of zinc alloy plating (except the test piece 17) for forming the intermediate zinc layer, and (a treatment of tin alloy plating or) a treatment of tin plating for forming the tin layer. Conditions for the principal plating treatments carried out on the respective test pieces were as follows.

Zinc content percentages in the intermediate zinc layer were adjusted by varying a ratio of zinc ions and additive alloy element ions in a plating solution of zinc alloy. For instance, the following condition for the plating treatment of nickel zinc alloy is an example in which the zinc concentration in the intermediate zinc layer is 85% by mass (the test piece 15).

As for the test piece 17, the copper board were degreased, pickled and then tin plated; neither the treatment of nickel plating, the treatment of zinc plating or the treatment of zinc alloy plating were carried out. As for the test pieces 1 to 12, 17 and 19, the treatment of nickel plating forming the ground layer was not carried out. As the treatment of nickel alloy plating forming the ground layer, a treatment of nickel-phosphorus plating was carried out for the test piece 14 and a treatment of nickel-iron plating was carried out for the test piece 18.

Condition for Treatment of Nickel Plating
Applied Test Pieces: 13, 15, 16
Composition of Plating Bath
   Nickel Aminosulfonate: 300 g/L
   Nickel Chloride: 5 g/L
   Boric Acid: 30 g/L
Bath Temperature: 45° C.
Current Density: 5 A/dm$^2$
Condition for Treatment of Nickel Zinc Alloy Plating (Treatment of Zinc Alloy Plating)
Applied Test Piece: 15
Composition of Plating Bath
   Zinc Sulfate Heptahydrate: 75 g/L
   Nickel Sulfate Hexahydrate: 180 g/L
   Sodium Sulfate: 140 g/L
pH=2.0
Bath Temperature: 45° C.
Current Density: 5 A/dm$^2$
Condition for Treatment of Zinc Manganese Alloy Plating (Treatment of Zinc Alloy Plating)
Applied Test Pieces: 6, 19
Composition of Plating Bath
   Manganic Sulphate Monohydrate: 110 g/L
   Zinc Sulfate Heptahydrate: 50 g/L
   Trisodium Citrate: 250 g/L
pH=5.3
Bath Temperature: 30° C.
Current Density: 5 A/dm$^2$
Condition for Treatment of Zinc Molybdenum Alloy Plating (Treatment of Zinc Alloy Plating)
Applied Test Piece: 7
Composition of Plating Bath
   Hexaammonium Heptamolybdate (VI): 1 g/L
   Zinc Sulfate Heptahydrate: 250 g/L
   Trisodium Citrate: 250 g/L
pH=5.3
Bath Temperature: 30° C.
Current Density: 5 A/dm$^2$
Condition for Treatment of Tin Plating
Applied Test Pieces: 1 to 19
Composition of Plating Bath
   Tin Methanesulfonate: 200 g/L
   Methanesulfonic Acid: 100 g/L
   Additive Agent
Bath Temperature: 35° C.
Current Density: 5 A/dm$^2$ As for the obtained test pieces 1 to 19, followings were measured: a thickness of the ground layer, a nickel content percentage of the ground layer, a film thickness of the intermediate zinc layer, a zinc content percentage of the intermediate zinc layer, a length proportion of low-angle grain boundaries in the tin layer, and an average crystal grain size in the tin layer.

The thicknesses of the intermediate zinc layer and the ground layer in the respective test pieces were measured by observing cross sections using a scanning ion microscope.

As for the zinc content percentage of the intermediate zinc layer and the nickel content percentage of the underground layer: respective observation test pieces were made by thinning the respective test pieces to 100 nm or thinner using a focused ion beam system (FIB: made by Seiko Instrument Inc., SMI3050 TB) and observed using a scanning transmission electron microscope (STEM: made by JEOL Ltd., JEM-2010F) at acceleration voltage 200 kV; the content percentages were measured using an energy dispersive X-ray spectrometry (EDS: made by Thermo Fisher Scientific K.K.) appended to the STEM.

The average crystal grain size of the tin layer was measured from an area fraction, by scanning electron beam on the surface of the tin layer and specifying crystal grain boundaries in which an orientation difference between adjacent measured points is not less than 2° by an EBSD orientation analysis.

As for the low-angle grain boundaries in the tin layer, after cleaning the surface using a flat milling device (made by Hitachi High-Technologies Corporation), the crystal grain boundaries were measured by EBSD measuring devices (S4300-SE made by Hitachi High-Technologies Corporation, OIM Data Collection made by TSL Solutions Co., Ltd./EDAX Business Unit AMETEK Co., Ltd.) and analyzing software (OIM Data Analysis ver. 5.2 made by TSL Solutions Co., Ltd./EDAX Business Unit AMETEK Co., Ltd). From the measuring results, the length proportion of the low-angle grain boundaries in the total length of the all crystal grain boundaries was analyzed by calculating the length of the crystal grain boundaries.

That is to say, irradiating the electron beam on respective measuring points (pixels) in a measuring area on a surface of the respective test pieces, recognizing measuring points in which the orientation difference between adjacent measured points is not less than 2° as the crystal grain boundaries and recognizing measuring points in which the orientation difference between adjacent measured points is not less than 2° and less than 15° as the low-angle grain boundaries by orientation analysis by electron back scatter diffraction, so that positions of the low-angle grain boundaries were determined. A total length L of grain boundaries in the crystal grain boundaries and a total length Lσ of grain boundaries in the low-angle grain boundaries were measured in the measuring area; and a proportion Lσ/L was taken for a length proportion of low-angle grain boundaries.

Measurement conditions of EBSD method (EBSD conditions) and observation conditions (SEM conditions) in the scanning electron microscope SEM were as follows. Surfaces of the respective test pieces were fixed by an ion milling device at acceleration voltage 6 kV for 2 hours of radiation time, then measured and observed.
EBSD Conditions
Analysis Area: 10.0 μm×50.0 μm (measurement area: 10.0 μm×50.0 μm)
Measurement Step: 0.1 μm Capture Time: 11 msec/point
SEM Conditions
Acceleration Voltage: 15 kV
Beam Current: about 3.5 nA
WD: 15 mm A thickness and a concentration of the surface metallic-zinc layer in the respective test pieces were measured by XPS analysis using an XPS (X-ray Photoelectron Spectroscopy) analyzing device (ULVAC PHI model-5600LS made by Ulvac Phi Incorporated), while etching the surface of the respective test pieces by argon ion. XPS Analysis conditions are as follow.

XPS Analysis Conditions
X ray Source: Standard MgKα 350 W
Pass Energy: 187.85 eV (Survey), 58.70 eV (Narrow)
Measurement Interval: 0.8 eV/step (Survey), 0.125 eV (Narrow)
Photoelectron Extraction angle with respect to a test piece surface: 45 deg
Analysis Area: about 800 μmø (ø means diameter)

As for the thickness of the surface metallic-zinc layer of the respective test pieces, "a film thickness in terms of $SiO_2$" was calculated from time necessitated for measuring the surface metallic-zinc layer using an etching rate of $SiO_2$ measured in advance by the same device (the above-mentioned XPS analyzing device).

The above-mentioned etching rate of $SiO_2$ in the XPS analyzing device was calculated from time necessitated for etching the $SiO_2$ film having a thickness 20 nm in an rectangle area of 2.8×3.5 mm by argon ion (Ar ion) beam. That is to say, in a case in the above-mentioned XPS analyzing device, 8 minutes was necessary for etching the $SiO_2$ film having the thickness 20 nm: the etching rate is 2.5 nm/min.

Depth resolution of the XPS analyzing device is high as about 0.5 nm though, the etching rate by Ar ion beam varies in accordance with materials: therefore, in order to obtain the film thickness, it is necessary to prepare a flat test piece having already-known film thickness for each material and calculate an etching rate thereof so as to set a standard. This approach is not easy, so that the "film thickness in terms of $SiO_2$" was calculated from the etching rate of $SiO_2$ and the time necessitated for etching an object.

Accordingly, the "film thickness in terms of $SiO_2$" of the surface metallic-zinc layer in the respective test pieces is different from an actual film thickness. However, even though the actual film thickness is uncertain, each of the film thicknesses can be evaluated by a single standard of the "film thickness in terms of $SiO_2$".

The respective test pieces were cut out to be 10×50 mm, coated at parts such as end surfaces in which copper (the substrate) was exposed with epoxy resin, and soaked in solution of sodium chloride with 23° C., 5% by mass: corrosion potential was a mean value of spontaneous potential measured for 24 hours with an interval of 1 minute using a zero shunt ammeter (HA1510 made by Hokuto Denko Corporation), with a reference electrode is a silver-silver chloride electrode (Ag/AgCl electrode of a double-junction type made by Metrohm Japan Ltd.) in which saturated solution of potassium chloride is filled as solution of inner tower.

Table 1 shows measured results of these. Additive elements other than zinc are denoted within parentheses in columns of the zinc content percentage of the intermediate zinc layer. The surface metallic-zinc layer was not appeared in the test pieces 1 to 4, 17, and 19.

TABLE 1

| TEST PIECE No. | GROUND LAYER THICKNESS (μm) | GROUND LAYER Ni CONTENT PERCENTAGE (%) | INTERMEDIATE ZINC LAYER FILM THICKNESS (μm) | INTERMEDIATE ZINC LAYER ZINC CONTENT PERCENTAGE (%) | TIN LAYER LENGTH PROPORTION (%) OF LOW ANGLE GRAIN BOUNDARIES | TIN LAYER AVERAGE CRYSTAL GRAIN SIZE (μm) | SURFACE METAL-ZINC LAYER FILM THICKNESS IN TERMS OF $SiO_2$ (nm) | SURFACE METAL-ZINC LAYER CONCENTRATION (%) | CORROSION POTENTIAL (mV vs. Ag/AgCl) |
|---|---|---|---|---|---|---|---|---|---|
| 1 | 0 | — | 0.10 | 60 (Ni) | 30 | 9.0 | | | −490 |
| 2 | 0 | — | 5.00 | 96.5 (Ni) | 2 | 0.4 | | | −940 |
| 3 | 0 | — | 0.30 | 55 (Ni) | 25 | 0.2 | | | −500 |
| 4 | 0 | — | 2.00 | 96 (Ni) | 21 | 0.2 | | | −880 |
| 5 | 0 | — | 1.00 | 70 (Co) | 8 | 10.0 | 0.5 | 3 | −520 |
| 6 | 0 | — | 1.00 | 68 (Mn) | 15 | 0.3 | 0.5 | 2 | −540 |
| 7 | 0 | — | 1.00 | 95 (Mo) | 16 | 0.3 | 12.0 | 3 | −650 |
| 8 | 0 | — | 1.00 | 72 (Pb) | 9 | 0.3 | 15.0 | 1 | −630 |
| 9 | 0 | — | 1.00 | 95 (Cd) | 10 | 0.3 | 19.0 | 51 | −790 |
| 10 | 0 | — | 1.00 | 92 (Fe) | 19 | 0.3 | 0.5 | 2 | −550 |
| 11 | 0 | — | 1.00 | 65 (Ni) | 20 | 0.3 | 22.0 | 45 | −800 |
| 12 | 0 | — | 0.40 | 75 (Ni) | 4 | 8.0 | 0.5 | 3 | −580 |
| 13 | 0.05 | 100 | 1.20 | 93 (Ni) | 6 | 0.5 | 10.0 | 40 | −710 |
| 14 | 0.10 | 90 (Ni —P) | 0.50 | 82 (Ni) | 5 | 1.5 | 2.5 | 16 | −600 |
| 15 | 5.00 | 100 | 0.50 | 85 (Ni) | 8.5 | 2.4 | 1.0 | 5 | −590 |
| 16 | 0.50 | 100 | 0.15 | 90 (Ni) | 7 | 4.0 | 3.0 | 15 | −620 |
| 17 | 0 | — | 0 | 0 | 71 | 9.1 | | | −420 |
| 18 | 5.60 | 70 (Ni —Fe) | 5.50 | 96 (Fe) | 1 | 0.1 | 20.0 | 60 | −920 |
| 19 | 0 | — | 0.05 | 60 (Mn) | 41 | 0.1 | | | −430 |

The test pieces 1 to 19 were measured and evaluated with respect to corrosion potential, bending workability, occurrences of whiskers, and contact resistance. Table 2 shows results of these.

As for the corrosion current, current between a pure aluminum wire and the test piece was measured and taken as the corrosion current: the pure aluminum wire was coated by resin except an exposed part of 2 mm diameter and the test piece was coated by resin except an exposed part of 6 mm diameter: the pure aluminum wire and the test piece were disposed in salt solution 23° C., 5% by mass with facing the respective exposed parts to each other with a distance 1 mm:

and the current was measured before and after heating the respective test piece at 150° C. for 1 hour using the zero shunt ammeter (HA1510 made by Hokuto Denko Corporation). Smaller the corrosion current, higher an effect of preventing the galvanic corrosion.

As for the bending workability, bending work was carried out on the respective test pieces with a load at $9.8 \times 10^3$ N in a perpendicular direction to a rolling direction using a W-bending test jig specified by JIS (Japanese Industrial Standard) H3110. The respective test pieces after the bending work were, in accordance with observation of the bended part by a stereoscopic microscope, judged to be "excellent" if a positive crack was not recognized, "good" if the copper alloy of the substrate was not exposed even if cracks arose, or "not good" if the copper alloy of the substrate was exposed owing to the crack.

As for the occurrence of whiskers, on the respective test pieces cut off to be a rectangle flat sheet of 1 cm×1 cm, length of the longest whisker after leaving for 1000 hours at temperature 55° C. and relative humidity 95% RH was measured by observation in 3 view-fields with magnification of 100 by the electron microscope. It was judged to be "A" (excellent) if the whisker was not recognized, "B" (good) if the lengths of the whiskers were less than 50 μm, "C" (acceptable) if the lengths of the whiskers were not less than 50 μm and less than 100 μm, or "D" (failure) if the lengths of the whiskers were 100 μm or longer.

As for the contact resistance, in accordance with "a measuring method of surface electrical contact resistance" JCBA-T323 specified by Japan Copper and Brass Association, the contact resistance was measured on plated surfaces of the respective test pieces at a load 0.98 N in a sliding type (1 mm) using a 4-terminal contact resistance testing equipment (CRS-113-AU made by Yamasaki Seiki Research Institute, Ltd).

TABLE 2

| TEST PIECE No. | CORROSION CURRENT (μA) BEFORE HEATNG | CORROSION CURRENT (μA) AFTER HEATING | BENDING WORK-ABILITY | OCCUR-ENCE OF WHISKERS | CONTACT RESIST-ANCE (mΩ) |
|---|---|---|---|---|---|
| 1 | 5.5 | 6.1 | GOOD | B | 1.2 |
| 2 | 3.1 | 6.5 | GOOD | C | 3.1 |
| 3 | 5.0 | 5.5 | GOOD | B | 1.9 |
| 4 | 3.5 | 6.2 | GOOD | C | 2.9 |
| 5 | 2.2 | 3.5 | GOOD | B | 0.8 |
| 6 | 1.9 | 2.5 | GOOD | B | 0.9 |
| 7 | 1.3 | 3.5 | GOOD | B | 0.7 |
| 8 | 1.8 | 3.1 | GOOD | B | 0.6 |
| 9 | 1.5 | 4.5 | GOOD | B | 0.7 |
| 10 | 1.9 | 4.0 | GOOD | B | 0.8 |
| 11 | 1.5 | 3.0 | GOOD | B | 0.8 |
| 12 | 1.0 | 2.5 | GOOD | A | 0.9 |
| 13 | 1.1 | 2.0 | EXCELLENT | A | 0.8 |
| 14 | 0.6 | 1.1 | EXCELLENT | A | 0.4 |
| 15 | 0.5 | 0.9 | EXCELLENT | A | 0.4 |
| 16 | 0.4 | 1.2 | EXCELLENT | A | 0.4 |
| 17 | 8.5 | 8.5 | GOOD | B | 0.6 |
| 18 | 7.8 | 7.5 | NOT GOOD | D | 5.2 |
| 19 | 8.1 | 8.2 | NOT GOOD | D | 0.7 |

As shown in Table 1 and Table 2, in the test pieces 1 to 16 in that the thickness of the intermediate zinc layer is 0.10 μm to 5.00 μm (inclusive) and the length proportion of low-angle grain boundaries of the tin layer is 2% to 30% (inclusive); the corrosion current was low as not higher than 5.5 μA before heating and not higher than 6.5 μA after heating; the bending workability was good; the whiskers did not recognized, or even though the whiskers arose, the length was small as less than 100 μm; and the contact resistance was also low as not more than 3.1 mΩ. Especially in the test pieces 12 to 16 above all, the zinc content percentage in the intermediate zinc layer was 75 to 93% and the average crystal grain size of tin in the tin layer was 0.5 to 8.0 μm, which are in desirable ranges; the whiskers were prevented from arising and the corrosion current value before heating was also low.

Having the ground layer with the nickel content percentage of not less than 80% by mass between the substrate and the intermediate zinc layer, the test pieces 13 to 16 showed the excellent effect of preventing galvanic corrosion even after heating compared to the test pieces 1 to 12 having no ground layer. Among the test pieces 13 to 16, especially in the test pieces 14 to 16 having the ground layer with the thickness not less than 0.10 μm, the corrosion current value after heating was low.

Furthermore, in the test pieces 5 to 16 in that the surface metallic-zinc layer is formed on the surface, the bending workability was good and the contact resistance was lower than the others, so the excellent results were shown. Furthermore, in the test pieces 13 to 16 having the surface metallic-zinc layer in that the zinc concentration is 5 at % to 40 at % (inclusive) and the thickness is 1.0 nm to 10.0 nm (inclusive) in terms of $SiO_2$, especially excellent results were shown.

Whereas, in the test piece 17 of a comparative example, the corrosion potential was high and the corrosion current was high because there was not the intermediate zinc layer (i.e., zinc was not adhered). In the test piece 18, the zinc dispersion was excessive because the length proportion of low-angle grain boundaries was less than 2%, so that the intermediate zinc layer was too thick and the bending workability was low: moreover, the corrosion potential was not more than −900 V vs. Ag/AgCl, so that the corrosion current value was deteriorated, the contact resistance was high, and the whiskers arose. In the test piece 19, the length proportion of low-angle grain boundaries excessed 30% and the film thickness of the intermediate zinc layer was small, so that the corrosion current value was high, cracks arose by the bending work, and the whiskers also arose.

Figure 6:
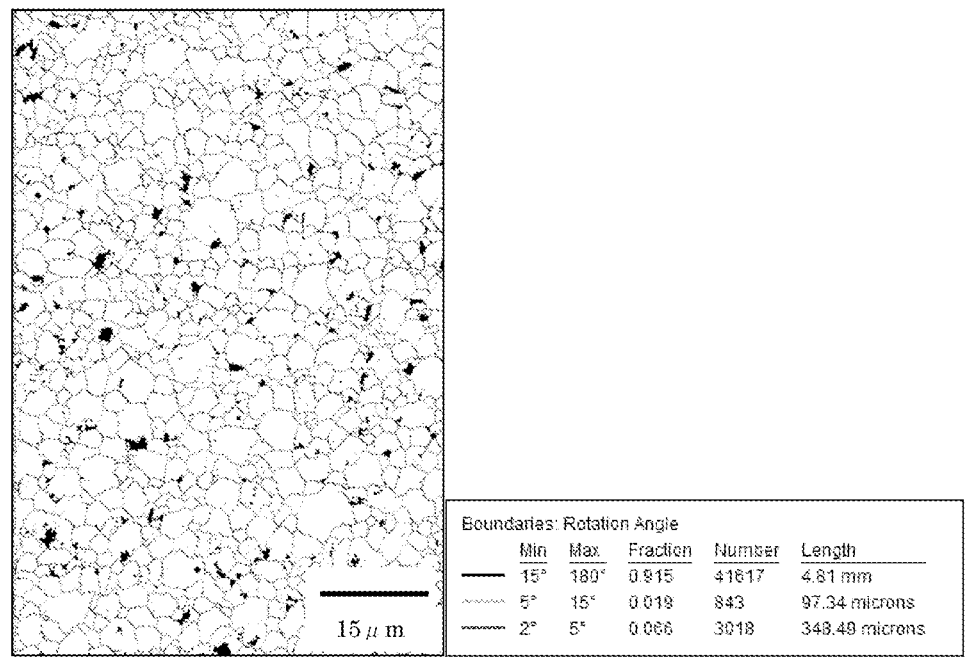
FIG. 6 It is a grain boundary map of a test piece 15 obtained by the EBSD orientation analysis.
Figure 7:
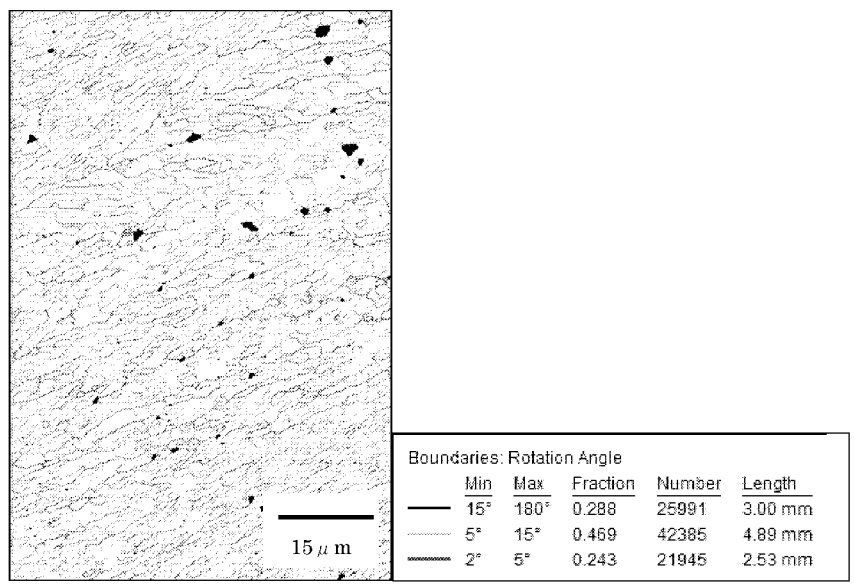
FIG. 7 It is a grain boundary map of a test piece 17 obtained by the EBSD orientation analysis.

FIG. 6 shows a grain boundary map of the test piece 15: FIG. 7 shows a grain boundary map of the test piece 17. Comparing to the test piece 15 in FIG. 6, in the test piece 17 in FIG. 6, the proportion of the low-angle boundaries is extremely higher: as a result, the zinc diffusion is not enough and the corrosion current is high.

Figure 8:
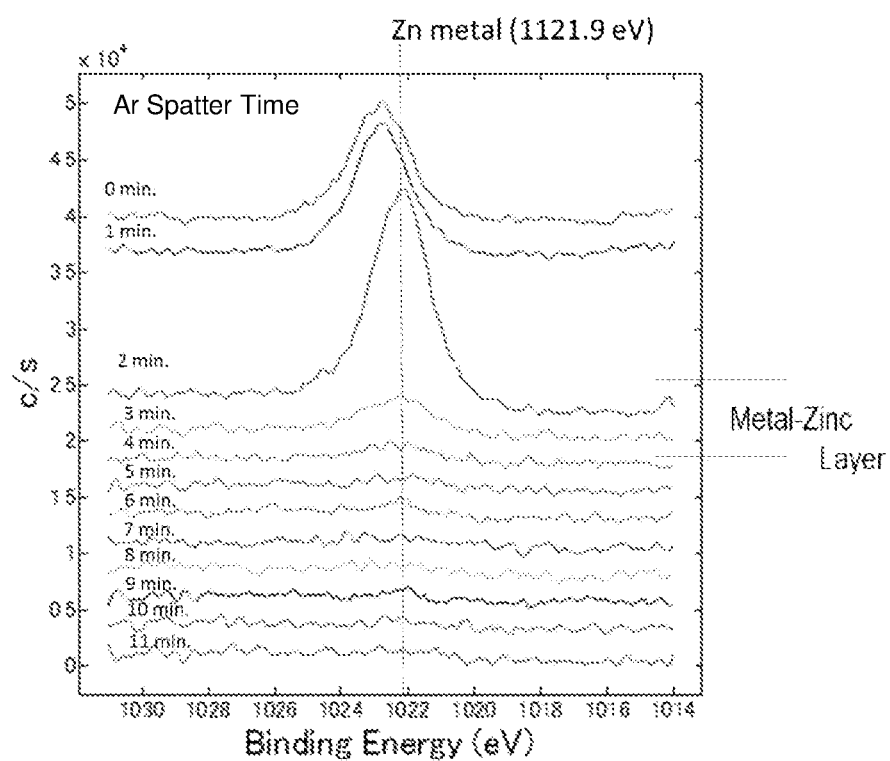
FIG. 8 It is a chemical state analysis graph in a depth direction with respect to zinc in a superficial part of a test piece 14 of the tin-plated copper terminal material.

FIG. 8 is an analysis diagram of a chemical state in a depth direction of the test piece 14. It is possible to judge from a chemical shift of binding energy that oxide is the main component in a depth 2.5 nm from the outermost surface; and the metallic-zinc is the main component in the depth from 2.5 nm.

INDUSTRIAL APPLICABILITY

It is possible to provide a tin-plated copper terminal material, a terminal formed of the terminal material, and an electric-wire terminal structure using the terminal which can effectively prevent the galvanic corrosion.

REFERENCE SIGNS LIST 1, 100 Tin-plated copper Terminal Material
2 Substrate

3 Ground Layer
4 Intermediate Zinc Layer
5 Tin Layer
6 Surface metallic-zinc layer
10 Terminal
11 Connector Part
12 Electronic Wire
12a Core
12b Coat
13 Core-Crimping Part
14 Coat-crimping part

The invention claimed is:

1. A tin-plated copper terminal material comprising: a substrate made of copper or a copper alloy; an intermediate zinc layer formed on the substrate, made of a zinc alloy, and having a thickness of not less than 0.10 μm and not more than 5.00 μm; and a tin layer made of tin or a tin alloy, formed on the intermediate zinc layer, in which a proportion of a length occupied by low-angle grain boundaries is not less than 2% and not more than 30% with respect to a total length of all crystal grain boundaries.

2. The tin-plated copper terminal material according to claim 1, wherein corrosion potential with respect to a silver-silver chloride electrode is not more than −500 mV and not less than −900 mV.

3. The tin-plated copper terminal material according claim 1, wherein the intermediate zinc layer comprising one or more among nickel, iron, manganese, molybdenum, cobalt, cadmium and lead as an additional element, and content percentage of zinc in the intermediate zinc layer is not less than 65% by mass and not more than 95% by mass.

4. The tin-plated copper terminal material according to claim 1, wherein an average crystal grain size of the tin layer is not less than 0.5 μm and not more than 8.0 μm.

5. The tin-plated copper terminal material according to claim 1, wherein a surface metallic-zinc layer is provided on the tin layer.

6. The tin-plated copper terminal material according to claim 5, wherein the surface metallic-zinc layer has zinc concentration of not less than 5 at % and not more than 40 at %.

7. The tin-plated copper terminal material according to claim 1, comprising a ground layer between the substrate and the intermediate zinc layer, made of nickel or a nickel alloy, with a thickness of not less than 0.10 μm and not more than 5.00 μm and a nickel content percentage of not less than 80% by mass.

8. The tin-plated copper terminal material according to claim 1, comprising a belt-sheet shape carrier part, and elements connected to the carrier part and disposed in an interval in a longitudinal direction of the belt-sheet shape carrier part.

9. A terminal formed from the tin-plated copper terminal material according to claim 1.

10. An electric-wire terminal structure wherein the terminal according to claim 9 is crimped to an electric wire made of an aluminum wire or an aluminum alloy wire.

* * * * *